United States Patent [19]
Wilson

[11] Patent Number: 5,431,435
[45] Date of Patent: Jul. 11, 1995

[54] DOOR PANEL AIR BAG COVER

[75] Inventor: Phillip S. Wilson, Dover, N.H.

[73] Assignee: Davidson Textron Inc., Dover, N.H.

[21] Appl. No.: 312,216

[22] Filed: Sep. 26, 1994

[51] Int. Cl.$^6$ .............................................. B60R 21/16
[52] U.S. Cl. ............................. 280/728.3; 280/728.1; 280/728.2
[58] Field of Search ........... 280/730 A, 728 B, 730 R, 280/728 R, 731, 732

[56] References Cited

U.S. PATENT DOCUMENTS

| | | | |
|---|---|---|---|
| 4,400,010 | 8/1983 | Stütz et al. | 280/732 |
| 4,966,388 | 10/1990 | Warner et al. | 280/730 |
| 4,989,896 | 2/1991 | DiSalvo et al. | 280/732 |
| 5,058,919 | 10/1991 | Paquette et al. | 280/732 |
| 5,082,310 | 1/1992 | Bauer | 280/732 |
| 5,084,122 | 1/1992 | Fukashima et al. | 280/730 R |
| 5,154,444 | 10/1992 | Nelson | 280/732 |
| 5,180,187 | 1/1993 | Müller et al. | 280/732 |
| 5,224,732 | 7/1993 | Warner et al. | 280/730 |
| 5,342,088 | 8/1994 | Bauer | 280/728 B |

FOREIGN PATENT DOCUMENTS 4119788  7/1992  Germany .

Primary Examiner—Margaret A. Focarino
Assistant Examiner—Christopher Ellis
Attorney, Agent, or Firm—Reising, Ethington, Barnard & Perry

[57] ABSTRACT

A door trim panel includes a cover assembly for concealing an air bag restraint system that has an air bag, a housing for the air bag and a gas generator located in the housing for supplying gas to the air bag in response to vehicle impact. The cover assembly includes a frame defining an air bag opening and a flexible covering attached to the frame in a taut manner. The flexible covering which is juxtaposed the air bag has a single tear seam that is ruptured when the flexible covering is impacted by the inflating air bag and forms an elliptic opening for deployment of the air bag into the passenger compartment.

13 Claims, 2 Drawing Sheets

DOOR PANEL AIR BAG COVER

BACKGROUND OF THE INVENTION

This invention relates generally to air bag restraint systems for automotive vehicles and more particularly to a cover assembly for concealing an air bag restraint system in the automotive vehicle.

Air bag restraint systems in which an air bag inflates and deploys into the passenger compartment when the vehicle experiences a front impact of predetermined magnitude are well known. These systems generally employ an air bag for the vehicle driver that is usually housed in the vehicle steering wheel and may also employ an air bag for the front seat passengers that is housed in the vehicle instrument panel. In either case the air bag restraint system, is concealed behind a cover assembly that is opened upon deployment of the air bag. This cover assembly usually takes the form of a visible or invisible door arrangement that comprises at least one door or flap that is pivoted from a closed position to an open position for allowing deployment of the air bag into the passenger compartment. See for instance, U.S. Pat. No. 5,154,444 granted to Eric S. Nelson Oct. 13, 1992 for an Air Bag Retainer with Cutting Flaps. This patent discloses an invisible door arrangement that comprises two or four flaps that are pivoted open for deployment of the air bag.

Inflatable air bag restraint systems are also now being proposed for side impact crash protection. These systems generally employ inflatable air bags that are usually housed in the side doors of the automotive vehicle. See for instance U.S. Pat. No. 4,966,388 granted to Charles Y. Warner et al Oct. 30, 1990 for an inflatable restraint system for side impact crash protection.

Air bag restraint systems for side impact protection are also concealed behind a cover assembly that must be opened for air bag deployment. However, there is very little space between the side door of the vehicle and the flank of the vehicle passenger that is to be protected. Consequently, the cover assembly must be opened with a minimal protrusion into the passenger compartment.

As indicated above cover arrangements for the front impact protection typically comprise one, two or four doors or flaps that are pivoted open for deployment of the air bag. These cover arrangements are not satisfactory for air bag restraint systems that are housed in side doors of the vehicle because the open doors or flaps of the cover assembly protrude too far into the passenger compartment. This problem is demonstrated in the Warner '388 patent directed to inflatable structures for side impact crash protection which uses a cushioning door panel for the side door of the vehicle that has a hinged section which overlies the air bag. This hinged section is pushed into the seat occupant when the air bag is deployed as shown in FIG. 3 of the patent.

The protrusion problem is addressed by Warner et al in a later patent, U.S. Pat. No. 5,224,732 granted Jul. 6, 1993. Here the entire cushioning panel for the side door of the vehicle breaks away. However, the cushioning panel is still pushed into the seat occupant when the air bag is deployed as shown in FIG. 17 of the Warner '732 patent.

The German Patent Application DE 41 19 788 published Jul. 23, 1992 addresses the protrusion problem in a different way by concealing the air bag in an arm rest. However, this solution is not satisfactory because the air bag is located in the lower portion of the door panel making it more difficult to protect the upper torso and head of the seat passenger.

SUMMARY OF THE INVENTION

The object of this invention is to provide an air bag cover assembly that projects into the passenger compartment very little when the cover assembly is opened for deployment of the air bag so that the cover assembly is well suited for concealing an air bag restraint system in the side door of a vehicle.

A feature of the invention is that air bag cover assembly bulges to form an opening for deployment of the air bag thereby minimizing protrusion into the passenger compartment and avoiding impact with the passengers.

Another feature of the invention is that the air bag cover assembly can be located in the upper portion of the door panel for increased effectiveness in protecting the upper torso and head of a seat occupant in a side impact crash.

Still another feature of the invention is that the air bag cover assembly uses a flexible cover that has a single tear seam that forms an elliptic opening for deployment of the air bag into the passenger compartment when the air bag cover bulges outwardly under the force of the inflating air bag.

Yet another feature of the invention is that the air bag cover assembly uses a flexible cover that has a single tear seam that does not require any corners to form a flap or door for air bag deployment.

Still yet another feature of the invention is that the air bag cover assembly uses a flexible cover that has a single tear seam that may be short in length for aesthetic or functional reasons because the flexible covering does not need to be bisected for air bag deployment.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
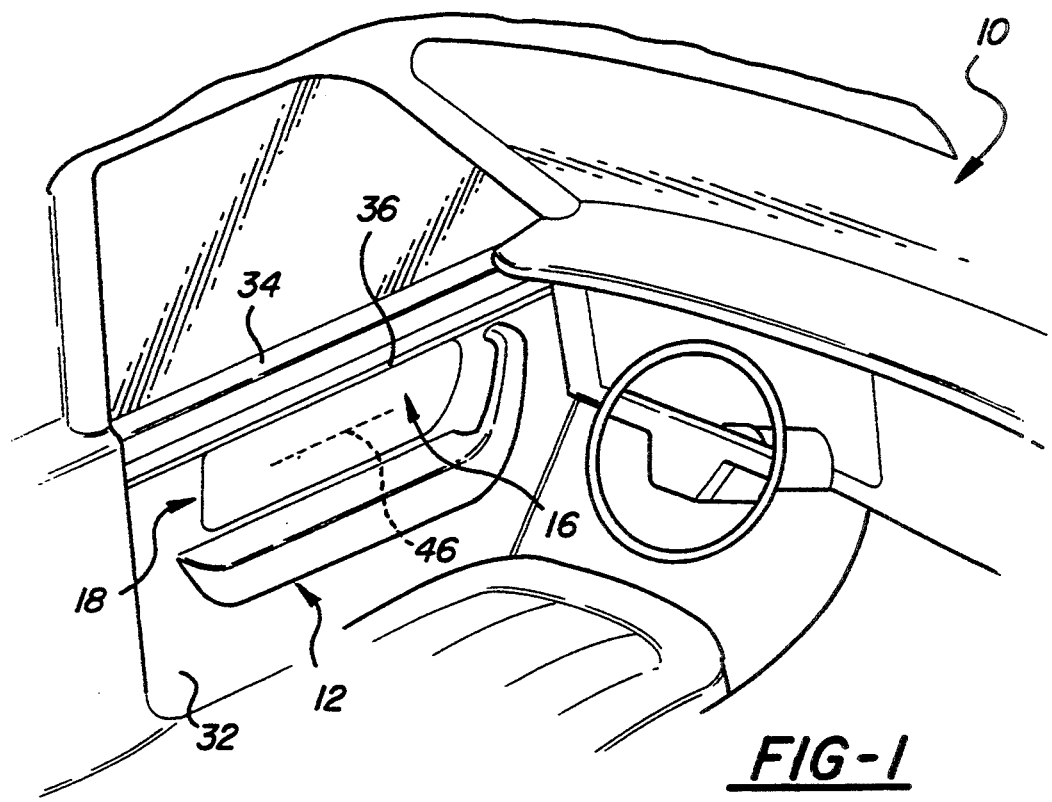
FIG. 1 is a perspective view of a vehicle side door having a cover assembly for an air bag restraint system in accordance with the invention.

Referring now to the drawing, an automotive vehicle 10 has a front driver's side door 12 that is equipped with an air bag restraint system 14 and a cover assembly 16 for concealing the air bag restraint system that is in accordance with the invention.

The side door 12 comprises a metal or composite frame (not shown) that is covered by an interior trim panel 18 that comprises a structural substrate 20 that is generally of a molded plastic and fastened to the frame of the side door 12. The substrate 20 defines an air bag opening 22 that is surrounded by an integral collar 24 of the substrate commonly called an air bag "shoot" that is reinforced by a flanged metal collar 26.

Figure 2:
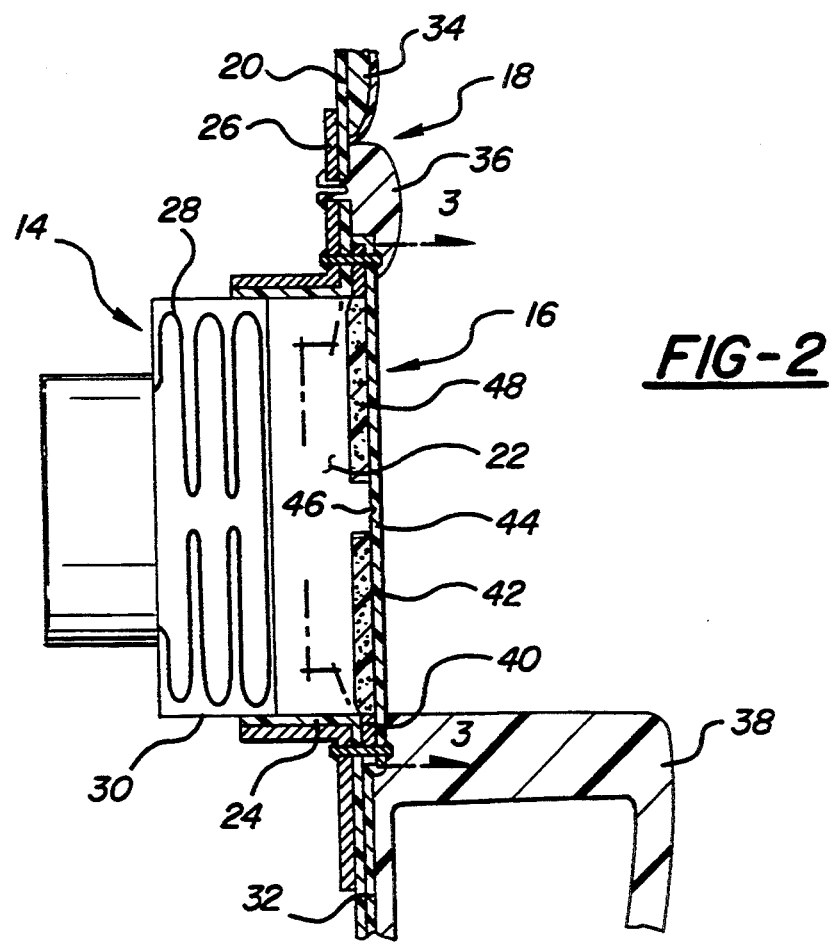
FIG. 2 is a vertical cross section of the vehicle side door that is shown in FIG. 1.

The air bag restraint system 16 which is conventional and operates in a well known manner is shown schematically in FIG. 2. It comprises an air bag 28, a housing 30 for the air bag and a gas generator (not shown) located in the housing 30 for supplying gas to the air bag in response to vehicle side impact.

The interior trim panel 18 customarily includes a decorative covering or coverings for the structural molded plastic substrate 20. In this case, the lower portion of the substrate 20 is covered by a thin flexible skin 32 of polyvinylchloride (PVC), thermoplastic polyurethane (TPU) or other suitable plastic and the upper portion is covered by a somewhat thicker flexible skin 34 of expanded polyvinylchloride (PVC), expanded thermoplastic polyurethane (TPU) or other suitable foam backed plastic that is designed to provide a soft feel. The flexible plastic skins 32 and 34 are adhesively bonded to the substrate 20 in a conventional manner.

The lower plastic skin 32 is separated from the upper padded or foam backed plastic skin 34 by a trim strip 36 of wood or hard plastic applique that is fastened to the substrate 20 mechanically. The interior trim panel 18 also includes an arm rest 38 that has an integral handle and that is mechanically attached to the substrate 20 below the air bag opening 22 in a conventional manner.

Figure 3:
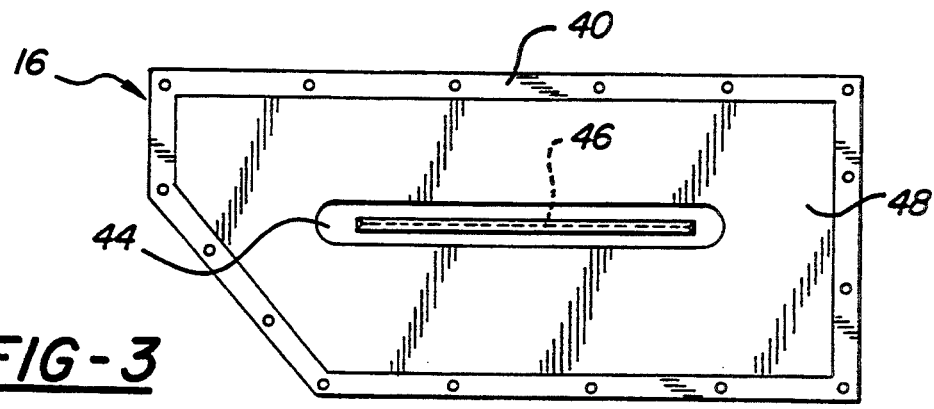
FIG. 3 is a section taken substantially along the line 3—3 of FIG. 2 looking in the direction of the arrows.
Figure 5:
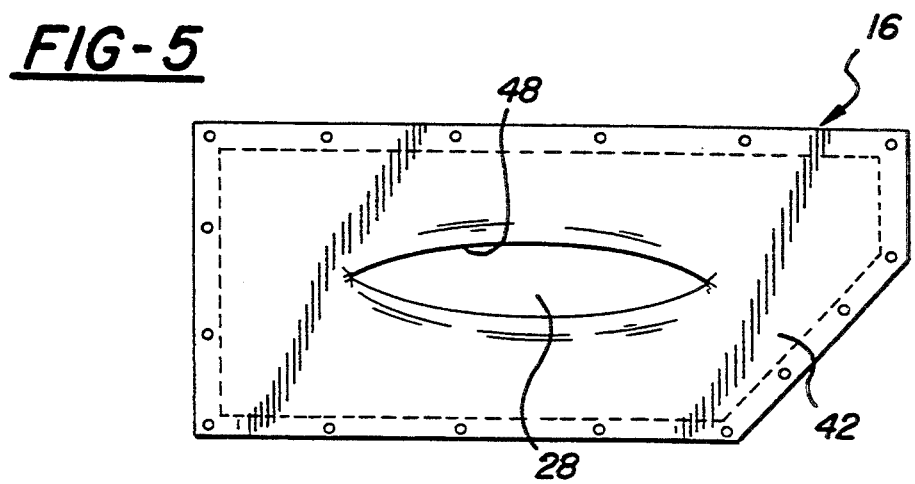
FIG. 5 is a section taken substantially along the line 5—5 of FIG. 4 looking in the direction of the arrows.

The cover assembly 16 for the air bag opening 22 comprises a rigid frame 40 and a flexible covering 42. The rigid frame 40 which may be made of aluminum, steel, structural plastic or other suitable structural material outlines and thus defines the air bag opening 22. The flexible covering 42 which may be made of polyvinylchloride (PVC), thermoplastic polyurethane (TPU) or any other flexible plastic material that is conventionally used as decorative material for door panels. It is attached to the rigid frame 40 so that the flexible covering 42 covers the opening of the rigid frame 40 in a taut manner. The outer margin of the flexible covering 42 is preferably adhesively bonded to the frame 40 and then mechanically fastened to the frame 40 at several locations spaced a short distance apart along the periphery of the frame 40 as best shown in FIGS. 3 and 5. The fasteners may also serve to attach the cover assembly 16 to the substrate 20.

Figure 4:
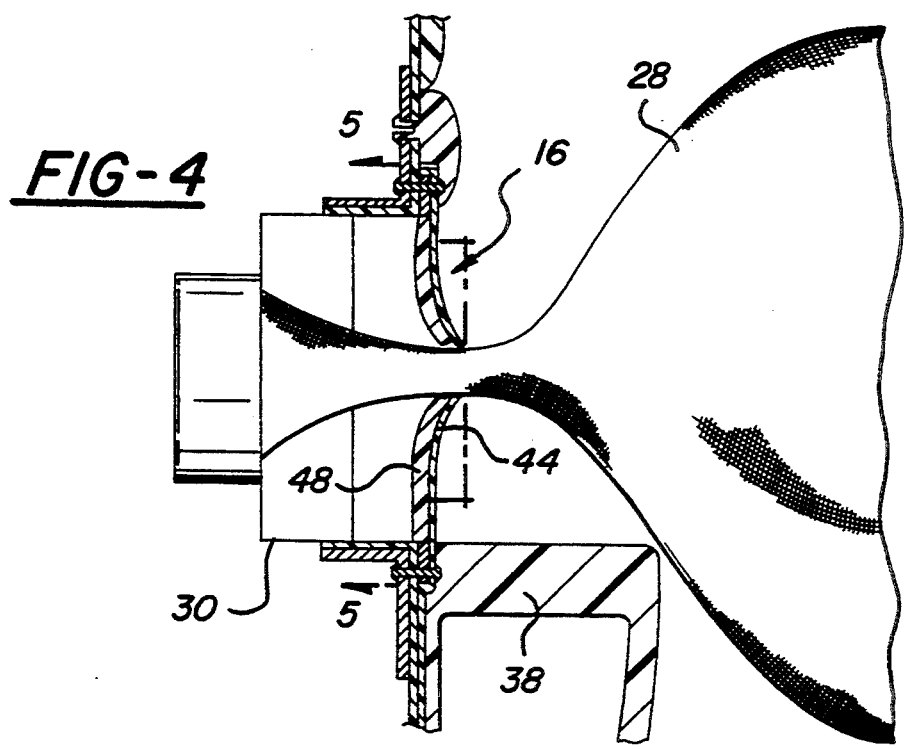
FIG. 4 is a vertical cross section of the vehicle side door of FIG. 1 after the air bag is deployed.

When the cover assembly 16 is attached to the substrate 20, the flexible covering 42 is juxtaposed the air bag 28 as shown in FIG. 2 so that the flexible covering 42 is directly engaged by the air bag 28 when it is inflated for deployment into the passenger compartment as shown in FIG. 4.

The flexible covering 42 comprises a thin flexible plastic skin 44 that is of a substantially uniform thickness except for a single tear seam 46 that is formed by an internal score line or groove as best shown in FIGS. 2 and 3. The tear seam 46 may be a series of short, closely spaced grooves as shown, one continuous groove, or anything in between. The flexible plastic skin 44 is preferably made of a flexible material selected from the group consisting of: thermoplastic elastomers (TPE), thermoplastic olefins (TPO), or thermoplastic urethanes (TPU) or other flexible thermoplastics which will tear in a ductile manner at temperatures below 0° C.

The tear seam 46 is spaced from the frame 40 so that when the flexible covering 42 is impacted by the inflating air bag 28 the tear seam 46 ruptures and the flexible covering 42 bulges outwardly to form an elliptic opening 48 for deployment of the air bag into the passenger compartment as shown in FIGS. 4 and 5.

The single tear seam 46 does not require any corners in order to provide the elliptic opening 48 for deployment of the air bag 28 as in the case of a flap or door. Moreover, the single tear seam 46 does not need to bisect the flexible covering 42 nor extend the full width of the frame 40 so that the length of the single tear seam 46 can be chosen for aesthetic or functional reasons.

The single tear seam 46 is preferably linear as shown for ease of manufacture although a curved configuration may be used. The single tear seam 46 is also preferably horizontal and located about halfway between the sides of the frame 40 in the vertical direction as shown.

The flexible covering 42 may also include a flexible plastic foam backing layer 48 to give the flexible covering 42 more body and enhance the aesthetic appearance of the air bag cover assembly 16. If a flexible plastic foam backing layer 48 is used, the tear seam 46 is preferably left uncovered and exposed to the air bag 28 as shown in the drawing. The foam backing layer is preferably made of a material selected from the group consisting of thermoset polyurethanes or foams of thermoplastic elastomers (TPE), thermoplastic olefins (TPO) or thermoplastic urethanes (TPU).

The flexible covering 42 may be reinforced with a flexible material so long as the reinforcement does not interfere with the tear seam 46.

While the air bag cover assembly 16 has been shown as a separate attachment to the interior trim panel 18, it should be understood that the air bag cover assembly 16 can be integrated into the interior trim panel 18. For instance the frame 40 can be incorporated into the substrate 20 as an integral part of the substrate 20.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A cover assembly for concealing an air bag restraint system including an air bag, a housing for the air bag, a gas generator located in the housing for supplying gas to the air bag in response to vehicle impact, the cover assembly comprising, a frame defining an air bag opening, a flexible covering attached to the frame so that the covering covers the air bag opening in a taut manner, the flexible covering being juxtaposed the air bag so that the flexible covering is directly engaged by the air bag when it is inflated for deployment into a passenger compartment, and the flexible covering having a single tear seam that is ruptured when the flexible covering is impacted by the inflating air bag to form an elliptic opening for deployment of the air bag into the passenger compartment, the tear seam being cornerless and having ends spaced from the frame.

2. The air bag covering as defined in claim 1 wherein the single tear seam is linear.

3. The air bag covering as defined in claim 1 wherein the flexible covering comprises a flexible plastic skin having the single tear seam and a flexible plastic foam backing layer that exposes the single tear seam.

4. The air bag covering as defined in claim. 1 wherein the flexible covering comprises a flexible plastic skin made of a flexible material selected from the group consisting of thermoplastic elastomers, thermoplastic olefins and thermoplastic urethanes.

5. The air bag covering as defined in claim 4 wherein the flexible covering further comprises a flexible plastic foam backing layer made of a material selected from the group consisting of thermoset polyurethanes, thermoplastic elastomers, thermoplastic polyolefins and thermoplastic urethanes.

6. A cover assembly for concealing an air bag restraint system including an air bag, a housing for the air bag, a gas generator located in the housing for supplying gas to the air bag in response to vehicle impact, the cover assembly comprising, a frame defining an air bag opening, a flexible covering attached to the frame so that the covering covers the air bag opening in a taut manner, the flexible covering being juxtaposed the air bag so that the flexible covering is directly engaged by the air bag when it is inflated for deployment into a passenger compartment, and the flexible covering having a substantially uniform thickness except for a single tear seam that is ruptured when the flexible covering is impacted by the inflating air bag and forms an elliptic opening for deployment of the air bag into the passenger compartment, the tear seam being cornerless and having ends spaced from the frame.

7. The air bag covering as defined in claim 6 wherein the single tear seam is linear.

8. The air bag covering as defined in claim 7 wherein the single tear seam has ends that are spaced from the frame.

9. The air bag covering as defined in claim 6 wherein the flexible covering comprises a flexible plastic skin having the single tear seam and a flexible plastic foam backing layer that exposes the single tear seam.

10. The air bag covering as defined in claim 2 wherein the flexible covering comprises a flexible plastic skin made of a flexible material selected from the group consisting of thermoplastic elastomers, thermoplastic olefins and thermoplastic urethanes.

11. The air bag covering as defined in claim 10 wherein the flexible covering further comprises a flexible plastic foam backing layer made of a material selected from the group consisting of thermoset polyurethanes, thermoplastic elastomers, thermoplastic polyolefins and thermoplastic urethanes.

12. A cover assembly for concealing an air bag restraint system including an air bag, a housing for the air bag, a gas generator located in the housing for supplying gas to the air bag in response to vehicle impact, the cover assembly comprising, a frame defining an air bag opening, a flexible covering attached to the frame so that the covering covers the air bag opening in a taut manner, the flexible covering being juxtaposed the air bag so that the flexible covering is directly engaged by the air bag when it is inflated for deployment into a passenger compartment, and the flexible covering having a substantially uniform thickness except for a single, generally straight and horizontal tear seam that is cornerless and has ends spaced from the frame so that the flexible covering is ruptured along the tear seam and forms an elliptic opening for deployment of an air bag when the flexible covering is impacted by the inflating air bag.

13. The air bag covering as defined in claim 12 wherein the flexible covering consists of a flexible plastic skin having the single tear seam and a flexible plastic foam backing layer that exposes the single tear seam.

* * * * *